(12) United States Patent
Uehara et al.

(10) Patent No.: US 7,385,934 B2
(45) Date of Patent: Jun. 10, 2008

(54) RADIO COMMUNICATION APPARATUS AND TRANSFER RATE DECISION METHOD

(75) Inventors: Toshiyuki Uehara, Yokosuka (JP); Kazuyuki Miya, Kawasaki (JP); Takenobu Arima, Yokosuka (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 959 days.

(21) Appl. No.: 10/476,845

(22) PCT Filed: Feb. 6, 2003

(86) PCT No.: PCT/JP03/01211

§ 371 (c)(1),
(2), (4) Date: Nov. 6, 2003

(87) PCT Pub. No.: WO03/067916

PCT Pub. Date: Aug. 14, 2003

(65) Prior Publication Data

US 2005/0128976 A1    Jun. 16, 2005

(30) Foreign Application Priority Data

Feb. 7, 2002 (JP) ............................. 2002-030942

(51) Int. Cl.
*G01R 31/08* (2006.01)
(52) U.S. Cl. .................... 370/252; 375/285; 455/69
(58) Field of Classification Search ............... 370/310, 370/328, 465; 375/254, 284, 285, 296; 714/708; 455/69

See application file for complete search history.

(56) References Cited

U.S. PATENT DOCUMENTS 5,974,106 A * 10/1999 Dupont et al. ............... 375/377

| | | | |
|---|---|---|---|
| 6,618,596 B1 * | 9/2003 | Uchida | 455/522 |
| 6,999,430 B2 * | 2/2006 | Holtzman et al. | 370/328 |
| 7,050,488 B2 * | 5/2006 | Miyoshi et al. | 375/219 |
| 7,088,683 B2 * | 8/2006 | Sawada et al. | 370/252 |
| 2001/0055287 A1 | 12/2001 | Sawada et al. | |

(Continued)

FOREIGN PATENT DOCUMENTS

CN    1318233    10/2001

(Continued)

OTHER PUBLICATIONS

European Office Action dated Sep. 22, 2005.

(Continued)

*Primary Examiner*—Min Jung
(74) *Attorney, Agent, or Firm*—Dickinson Wright, PLLC

(57) ABSTRACT

A transmission rate determining method that enables assignment of transmission rate (modulation scheme and coding rate) to be optimized with high accuracy in the AMC technique. In the method, in a base station, Doppler frequency detector 117 detects the Doppler frequency (moving speed) of each mobile station. MCS assignment section 125 corrects a relational expression of MCS (coding rate and modulation scheme) and CIR based on the Doppler frequency (moving speed) obtained in Doppler frequency detector 117, for example, corrects a threshold in CIR, and determines MCS optimal for CIR report value. Results of assignment in MCS assignment section 125 are output to coding section 101 and modulation section 103.

14 Claims, 11 Drawing Sheets

U.S. PATENT DOCUMENTS

| | | |
|---|---|---|
| 2002/0106989 A1 | 8/2002 | Aizawa et al. |
| 2003/0123477 A1* | 7/2003 | Gollamudi et al. ......... 370/465 |
| 2004/0131021 A1* | 7/2004 | Kanemoto et al. ......... 370/320 |
| 2005/0190718 A1* | 9/2005 | Holtzman et al. ......... 370/328 |

FOREIGN PATENT DOCUMENTS

| | | | |
|---|---|---|---|
| EP | 0942550 A1 | | 9/1999 |
| EP | 1128577 | | 8/2001 |
| EP | 1213888 | | 6/2002 |
| EP | 1259015 | | 11/2002 |
| JP | 11331936 | | 11/1999 |
| JP | 2001 44930 | | 2/2001 |
| JP | 2001-268019 | * | 9/2001 |
| JP | 2001 268019 | | 9/2001 |
| JP | 2001 333051 | | 11/2001 |
| JP | 2002 9734 | | 1/2002 |
| JP | 2002 44168 | | 2/2002 |
| JP | 2003/37554 | | 2/2003 |
| JP | 2003 143654 | | 5/2003 |

OTHER PUBLICATIONS

Chinese Office Action dated Sep. 9, 2005 with English translation.
European Search Report dated Oct. 18, 2004.
Patent Abstracts of Japan vol. 2000, No. 04, Aug. 31, 2000 & JP 2000 023250 A (NEC Corp), Jan. 21, 2000.
International Search Report dated May 27, 2003.
3GPP TR 25.848 V4.00(Mar. 2001), "Adaptive Modulation and Coding (AMC)", pp. 1-2.

* cited by examiner

| DOPPLER FREQUENCY (MOVING SPEED) | CORRECTION AMOUNT IN SELECTION |
|---|---|
| LARGE | LARGE |
| MIDDLE | MIDDLE |
| SMALL | SMALL |

| DOPPLER FREQUENCY (MOVING SPEED) | CORRECTION AMOUNT IN REPORT VALUE |
|---|---|
| LARGE | LARGE |
| MIDDLE | MIDDLE |
| SMALL | SMALL |

FIG.9

| CIR VARIATION AMOUNT | CORRECTION AMOUNT IN SELECTION |
|---|---|
| LARGE | LARGE |
| MIDDLE | MIDDLE |
| SMALL | SMALL |

FIG.11

RADIO COMMUNICATION APPARATUS AND TRANSFER RATE DECISION METHOD

TECHNICAL FIELD

The present invention relates to a radio communication apparatus and transmission rate determining method.

BACKGROUND ART

As a faster packet transmission system in IMT-2000, a system called HSDPA (High Speed Downlink Packet Access) has been studied for purposes of fast downlink peak transmission rate, low transmission delay, and high throughput, for example. As techniques for supporting HSDPA, a transmission system called AMC (Adaptive Modulation and coding) is disclosed in 3GPP (3rd Generation Partnership Project) TR25.848 "Physical layer aspects of UTRA High Speed Downlink Packet Access".

The AMC technique is to vary the modulation scheme and error correcting coding rate adaptively at high speed corresponding to variation in channel quality. In the AMC technique, as the channel quality is higher, a faster modulation scheme is used, thereby the error correcting coding rate is increased, and thus the transmission rate is increased. Specifically, a mobile station (or base station) measures downlink propagation conditions whenever necessary for each mobile station, and based on the measurement result, the base station determines a mobile station to transmit information and an optimal transmission rate to transmit the information. Regarding the transmission rate, considered are modulation schemes (for example, QPSK (Quaternary Phase Shift Keying) and 16QAM (Quaternary Amplitude Modulation)), coding rate (for example, turbo coding with a coding rate of ⅓ while performing puncture or repetition to vary the coding rate). Examples used as channel quality information include CIR (Carrier to Interference Ratio), SIR (Signal to Interference Ratio), TFRC (Transport Format and Resource Combination), and transmission power of a dedicated channel (for example, DPCH (Dedicated physical Channel)).

For example, in an application example in determining a transmission rate in the AMC technique, a base station determines a modulation scheme and coding rate (MCS: Modulation and Coding scheme), i.e., items associated with the transmission rate, based on CIR reported from a mobile station or the transmission rate of a dedicated channel.

However, in such determination of a transmission rate, there are following problems. That is, even when a transmission rate is determined based on information of instantaneous moment, the reliability of the information deteriorates due to effects of delay in assignment, moving speed of a mobile station, and/or accuracy in measuring channel quality in the mobile station or base station. For example, when the moving speed of a mobile station is low (the Doppler frequency is small), propagation environments do no vary greatly. However, when the moving speed is high (the Doppler frequency is large), propagation environments vary greatly, and the reliability of the information deteriorates. As a result, it is not possible to optimize the assignment of transmission rate, and there arise a possibility of having a significant effect on the throughput.

In addition, such an issue is not limited to HSDPA as described above, and arises widely in systems for controlling the transmission rate. In other words, although the spreading factor is fixed in HSDPA, since determination of the transmission rate is also related to the spreading factor and transmission power in addition to the modulation scheme and coding rate, it is not possible to optimize the determination of transmission rate when reliabilities of the above-mentioned pieces of information deteriorate, and there arises the possibility of having a significant effect on performance of the transmission system.

DISCLOSURE OF INVENTION

It is an object of the present invention to provide a radio communication apparatus and transmission rate determining method that enable determination of transmission rate to be optimized with high accuracy.

According to an aspect of the present invention, a radio communication apparatus has a determining section that determines a transmission rate in response to channel quality information using the relationship between the channel quality information and transmission rate, a detecting section that detects a relative moving speed of a communicating partner as information regarding a variation in channel quality, and a correcting section that corrects the transmission rate determined in the determining section, based on the relative moving speed detected in the detecting section.

According to another aspect, a radio communication apparatus has a determining section that determines a transmission rate in response to channel quality information using the relationship between the channel quality information and transmission rate, a detecting section that detects a relative moving speed of a communicating partner as information regarding a variation in channel quality, and a correcting section that corrects the channel quality information based on the relative moving speed detected in the detecting section.

According to still another aspect, a radio communication apparatus has a determining section that determines a transmission rate in response to channel quality information using the relationship between the channel quality information and transmission rate, a calculating section that calculates an amount of variation in channel quality as information regarding the variation in channel quality, and a correcting section that corrects the transmission rate determined in the determining section, based on the amount of variation in channel quality calculated in the calculating section.

According to still another aspect, a radio communication apparatus has a determining section that determines a transmission rate in response to channel quality information using a relational expression that specifies the relationship between the channel quality information and transmission rate, a detecting section that detects a relative moving speed of a communicating partner as information regarding a variation in channel quality, and a correcting section that corrects the relational expression based on the relative moving speed detected in the detecting section.

According to still another aspect, a radio communication apparatus has a determining section that determines a transmission rate in response to channel quality information using a relational expression that specifies the relationship between the channel quality information and transmission rate, a detecting section that detects a relative moving speed of a communicating partner as information regarding a variation in channel quality, and a correcting section that corrects the channel quality information based on the relative moving speed detected in the detecting section.

According to still another aspect, a radio communication apparatus has a determining section that determines a transmission rate in response to channel quality information using a relational expression that specifies the relationship between the channel quality information and transmission rate, a calculating section that calculates an amount of variation in channel quality as information regarding the variation in channel quality, and a correcting section that corrects the relational expression based on the amount of variation in channel quality calculated in the calculating section.

According to still anther aspect, a radio communication apparatus has a correcting section that performs predetermined correction processing based on information regarding a variation in channel quality, in determining a transmission rate, an acquiring section that acquires a reception probability that a communicating partner receives transmission data without any error, and a determining section that determines whether to perform the correction processing, based on the reception probability acquired in the acquiring section.

According to still another aspect, a radio communication apparatus has a correcting section that performs predetermined correction processing based on information regarding a variation in channel quality, in determining a transmission rate, and a transmitting section that transmits to a communicating partner a signal to notify whether or not the correction processing in the correcting section is performed.

According still another aspect of the present invention, a transmission rate determining method is a transmission rate determining method in a radio communication apparatus, and has a determining step of determining a transmission rate in response to channel quality information using the relationship between the channel quality information and transmission rate, a detecting step of detecting a relative moving speed of a communicating partner based on information regarding a variation in channel quality, and a correcting step of correcting the transmission rate determined in the determining step, based on the relative moving speed detected in the detecting step.

According to still another aspect, a transmission rate determining method is a transmission rate determining method in a radio communication apparatus, and has a determining step of determining a transmission rate in response to channel quality information using the relationship between the channel quality information and transmission rate, a detecting step of detecting a relative moving speed of a communicating partner based on information regarding a variation in channel quality, and a correcting step of correcting the channel quality information based on the relative moving speed detected in the detecting step.

According to still another aspect, a transmission rate determining method is a transmission rate determining method in a radio communication apparatus, and has a determining step of determining a transmission rate in response to channel quality information using the relationship between the channel quality information and transmission rate, a calculating step of calculating an amount of variation in channel quality based on information regarding the variation in channel quality, and a correcting step of correcting the transmission rate determined in the determining step, based on the amount of variation in channel quality calculated in the calculating step.

According to still another aspect, a transmission rate determining method is a transmission rate determining method in a radio communication apparatus, and has a determining step of determining a transmission rate in response to channel quality information using a relational expression that specifies the relationship between the channel quality information and transmission rate, a detecting step of detecting a relative moving speed of a communicating partner based on information regarding a variation in channel quality, and a correcting step of correcting the relational expression based on the relative moving speed detected in the detecting step.

According to still another aspect, a transmission rate determining method is a transmission rate determining method in a radio communication apparatus, and has a determining step of determining a transmission rate in response to channel quality information using a relational expression that specifies the relationship between the channel quality information and transmission rate, a detecting step of detecting a relative moving speed of a communicating partner based on information regarding a variation in channel quality, and a correcting step of correcting the channel quality information based on the relative moving speed detected in the detecting step.

According to still another aspect, a transmission rate determining method is a transmission rate determining method in a radio communication apparatus, and has a determining step of determining a transmission rate in response to channel quality information using a relational expression that specifies the relationship between the channel quality information and transmission rate, a calculating step of calculating an amount of variation in channel quality based on information regarding the variation in channel quality, and a correcting step of correcting the relational expression based on the amount of variation in channel quality calculated in the calculating step.

DRAWING DESCRIPTION

Brief Description of Drawings

FIG. 9 is a table illustrating an example of a control table indicative of a qualitative relationship between the Doppler frequency and correction amount in the fifth embodiment;

FIG. 11 is a table illustrating an example of a control table indicative of a qualitative relationship between a CIR variation amount and correction amount in the sixth embodiment.

DETAILED DESCRIPTION

Best Mode for Carrying out the Invention

Embodiments of the present invention will be described specifically below with reference to accompanying drawings.

First Embodiment

Figure 1:
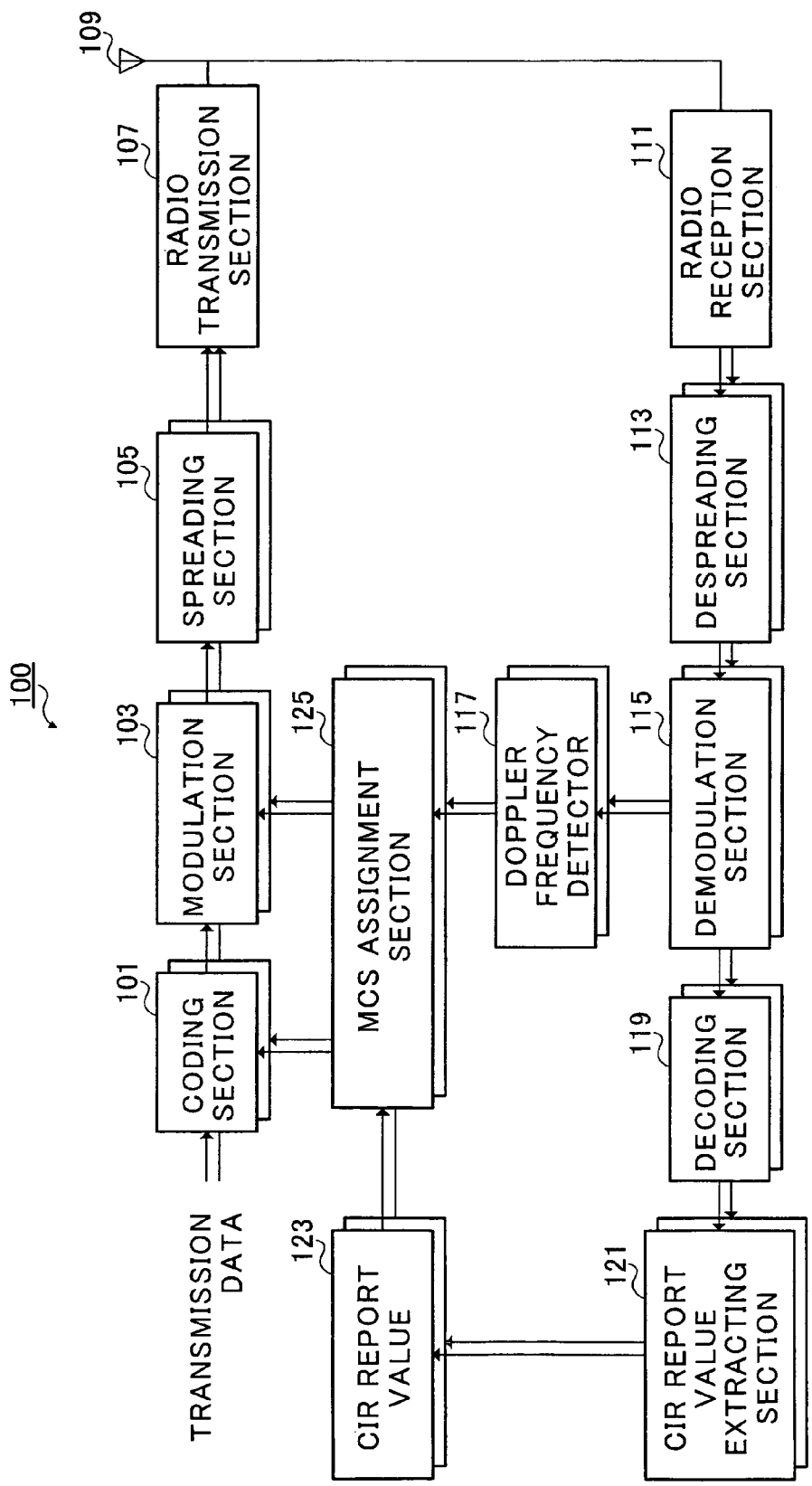
FIG. 1 is a block diagram illustrating a configuration of a radio communication apparatus on transmitting side according to a first embodiment of the present invention.

FIG. 1 is a block diagram illustrating a configuration of a radio communication apparatus on transmitting side according to the first embodiment of the present invention.

Radio communication apparatus 100 on transmitting as illustrated in FIG. 1 is, for example, a radio communication apparatus using the AMC technique, and has coding sections 101, modulation sections 103, spreading sections 105, radio transmission section 107, antenna 109, radio reception section 111, despreading sections 113, demodulation sections 115, Doppler frequency detectors 117, decoding sections 119, CIR report value extracting sections 121, CIR report value storing sections 123, and MCS assignment sections 125. Herein, in order to enable transmission data for a plurality of users to be handled, there are pluralities of sections as to 101, 103, 105, 113, 115, 117, 119, 121, 123 and 135, except radio transmission section 107, antenna 109 and radio reception section 111. Radio communication apparatus 100 on transmitting side is provided in, for example, a base station apparatus (hereinafter, simply referred to as a "base station") in a mobile communication system.

Figure 2:
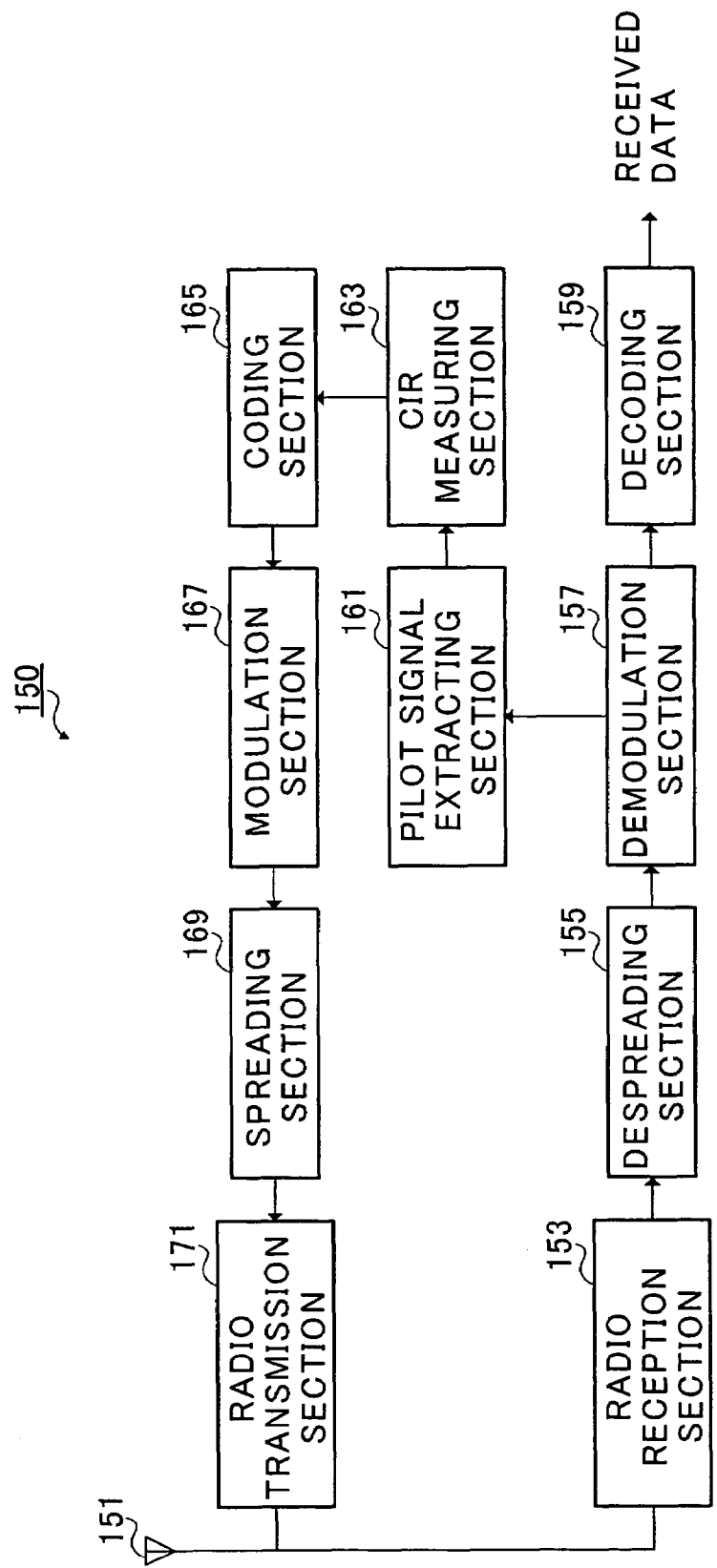
FIG. 2 is a block diagram illustrating a configuration of a radio communication apparatus on receiving side according to the first embodiment of the present invention.

FIG. 2 is a block diagram illustrating a configuration of a radio communication apparatus on receiving side according to the first embodiment of the present invention.

Radio communication apparatus 150 on receiving side as illustrated in FIG. 2 is, for example, a radio communication apparatus that performs radio communications with radio communication apparatus 100 on transmitting side as illustrated in FIG. 1 using the AMC technique, and has antenna 151, radio reception section 153, despreading section 155, demodulation section 157, decoding section 159, pilot signal extracting section 161, CIR measuring section 163, coding section 165, modulation section 167, spreading section 169, and radio transmission section 171. Radio communication apparatus 150 is, for examples provided in a mobile station apparatus (hereinafter, simply referred to as a "mobile station") in a mobile communication system.

The operation in radio communication apparatuses 100 and 150 with above-mentioned configurations respectively on transmitting side and receiving side will be described below.

In radio communication apparatus 100 (base station) on transmitting side, with respect to transmission data for each user, coding section 101 encodes transmission data, and modulation section 103 modulates the coded transmission data. At this point, according to assignment results (coding rate and modulation scheme) in MCS assignment section 125, coding section 101 and modulation section 103 perform error correcting coding and modulation, respectively. For example, the data is encoded with a coding rate of ⅓, a portion of parity is subjected to puncture or repetition, thereby varying the coding rate, and a modulation scheme is selected from, for example, QPSK and 16QAM. The determination of transmission rate (coding rate and modulation scheme) is based on information last obtained. The processing in MCS assignment section 125 will be described later. The modulated transmission data is output to spreading section 105.

Spreading section 105 spreads the modulated transmission data using a specific spreading code. The spread transmission data is output to radio transmission section 107, undergoes predetermined radio processing such as upconverting in the section 107, and is transmitted from antenna 109 as a radio signal.

Then, radio communication apparatus 150 (mobile station) on receiving side receives the radio signal transmitted from the base station using antenna 151, and the radio signal is output to radio reception section 153.

Radio reception section 153 performs predetermined radio processing such as downconverting on the signal received in antenna 151. Radio reception section 153 outputs the signal (baseband signal) to despreading section 155.

Despreading section 155 despreads the received signal using the same spreading code as used in transmission, and demodulation section 157 demodulates the despread received signal. The demodulated received signal is output to decoding section 159 and pilot signal extracting section 161.

Decoding section 159 decodes the demodulated received signal to obtain desired received data.

Meanwhile, pilot signal extracting section 161 extracts a predetermined pilot signal (known signal) from the demodulated received signal. The extracted pilot signal is output to CIR measuring section 163.

CIR measuring section 163 measures CIR, using the extracted pilot signal. CIR is one of information indicating reception quality, and an index indicating channel quality. The measured CIR value is output to coding section 165 as a CIR report value.

Coding section 165 encodes the measured CIR value together with the other information, modulation section 167 modulates the coded information successively, and spreading section 169 spreads the modulated information using a specific spreading code. The spread information is output to radio transmission section 171, undergoes predetermined radio processing such as upconverting in the section 171, and is transmitted from antenna 151 as a radio signal.

Then, radio communication apparatus 100 (base station) on transmitting side receives the radio signal transmitted from antenna 109 using antenna 109 to output to radio reception section 111.

Radio reception section 111 performs predetermined radio processing such as downconverting on the signal received in antenna 109. Radio reception signal 111 outputs the signal (baseband signal) to despreading section 113.

Despreading section 113 despreads the received signal using the same spreading code as used in transmitting for each mobile station, and demodulation section 115 demodulates the despread received signal. The demodulated received signal is output to Doppler frequency detector 117 and decoding section 119.

Doppler frequency detector 117 detects a Doppler frequency (i.e. moving speed) of the mobile station, using the demodulated received signal. The detection of the Doppler frequency (moving speed) is carried out for each mobile station that communicates with the base station. The detected Doppler frequency (moving speed) of each mobile station is output to MCS assignment section 125.

Meanwhile, decoding section 119 decodes the demodulated received signal. The decoded information is output to CIR report value extracting section 121.

CIR report value extracting section 121 extracts a CIR report value from the decoded information. The extracted CIR report value is stored in CIR report value storing section 123 in association with the mobile station that is a source of the report. The CIR report value of each mobile station stored in CIR report value storing section 123 is provided to MCS assignment section 125 when necessary.

Based on the CIR report value and the Doppler frequency (moving speed) of the mobile station, MCS assignment section 125 assigns optimal MCS (coding rate and modulation scheme) to the mobile station, for each mobile station.

Specifically, MCS assignment section 125 is set in advance for a relational expression of the MCS (coding rate and modulation scheme) and CIR.

The relational expression for assigning MCS for the reported CIR value may form a table or calculation formula. In the case of a table, MCS in response to the CIR report value is read from a table stored in ROM, etc. In the case of a calculation formula, MCS is calculated from a CIR report value for each time using the calculation formula with a DSP (Digital Signal Processor) etc.

Figures 3, 4:
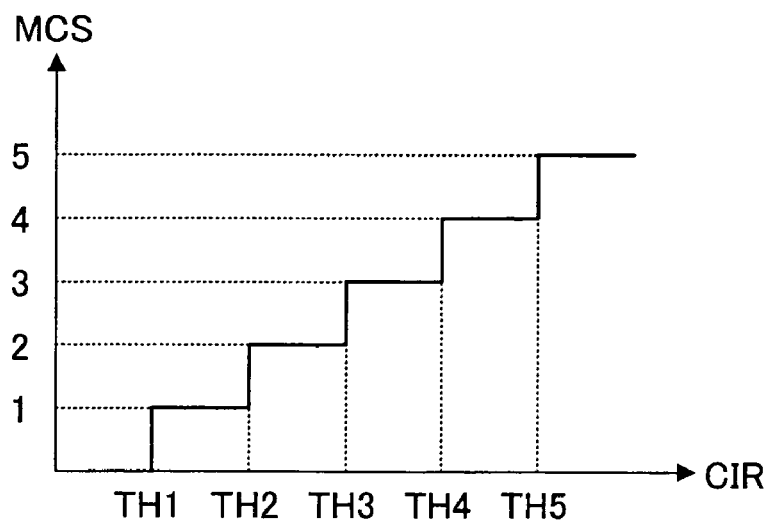
FIG. 3 is a graph illustrating an example of a relational expression of MCS and CIR used in MCS assignment in the first embodiment.
FIG. 4 is a table illustrating an example of a control table indicative of a qualitative relationship between the Doppler frequency and correction amount in the first embodiment.

FIG. 3 is a graph illustrating an example of the relational expression of MCS and CIR. Herein, as to CIR, five thresholds, TH1, TH2, TH3, TH4 and TH5 are set, and MCS is assigned by determining a range of the threshold in which the CIR report value is present. Specifically, in the case as illustrated in FIG. 3, MCS 1 is selected when the CIR report value is in a range from TH1 to less than TH2, MCS 2 is selected when the CIR report value is in a range from TH2 to less than TH3, MCS 3 is selected when the CIR report value is in a range from TH3 to less than TH4, MCS 4 is selected when the CIR report value is in a range from TH4 to less than TH5, and MCS 5 is selected when the CIR report value is in a range from TH5 to more than TH5. Each of MCS 1 to MCS 5 is a combination of a coding rate and modulation scheme, where the transmission rate is increased, as the number of MCS is increased.

In this embodiment, MCS assignment section 125 corrects the above-mentioned relational expression based on the detected Doppler frequency (moving speed), and thereby determines optimal MCS for the CIR report value. Specifically, based on the detected Doppler frequency (moving speed), the thresholds in the relational expression is corrected. More specifically, since there is a possibility that the channel quality deteriorates due to the effect of the Doppler frequency, the threshold is corrected so as to switch the transmission rate to be decreased (in the rightward direction in the example in FIG. 3).

At this point, for example, as shown in the control table in FIG. 4, when the Doppler frequency (moving speed) of the mobile station is large, a correction value in selection is set at a large value to correct the threshold largely. Further, when the Doppler frequency (moving speed) of the mobile station is of middle degree, a correction value in selection is set at a middle value to correct the threshold moderately, while when the Doppler frequency (moving speed) of the mobile station is small, a correction value in selection is set at a small value to correct the threshold in a small range. In other words, since the speed of variation in channel quality differs with the Doppler frequency (moving speed), the threshold is varied by a required correction amount (margin) so as to compensate for a variation in each transmission rate (each MCS).

In this way, thresholds TH1 to TH5 (see FIG. 3) of CIR in the above-mentioned relational expression are corrected in response to the Doppler frequency (moving speed) of the mobile station, and it is thereby possible to select an optimal transmission rate (MCS) in response to deterioration of the channel quality. The method for detecting the Doppler frequency includes not only a case of detecting a number of values, but also a case of judging three criteria of large, medium and small as described above.

MCS assignment section 125 outputs assignment results (optimal transmission rate and modulation scheme) to coding section 101 and modulation section 103, and the results are reflected in subsequent transmission of transmission data.

Thus, according to this embodiment, in the AMC technique, the Doppler frequency (moving speed) of each mobile station is detected, and based on the obtained Doppler frequency (moving speed), the relational expression of MCS (coding rate and modulation scheme) and CIR is corrected to determine optimal MCS, whereby it is possible to optimize assignments of the modulation scheme and coding rate with high accuracy in the AMC technique.

Second Embodiment

Figure 5:
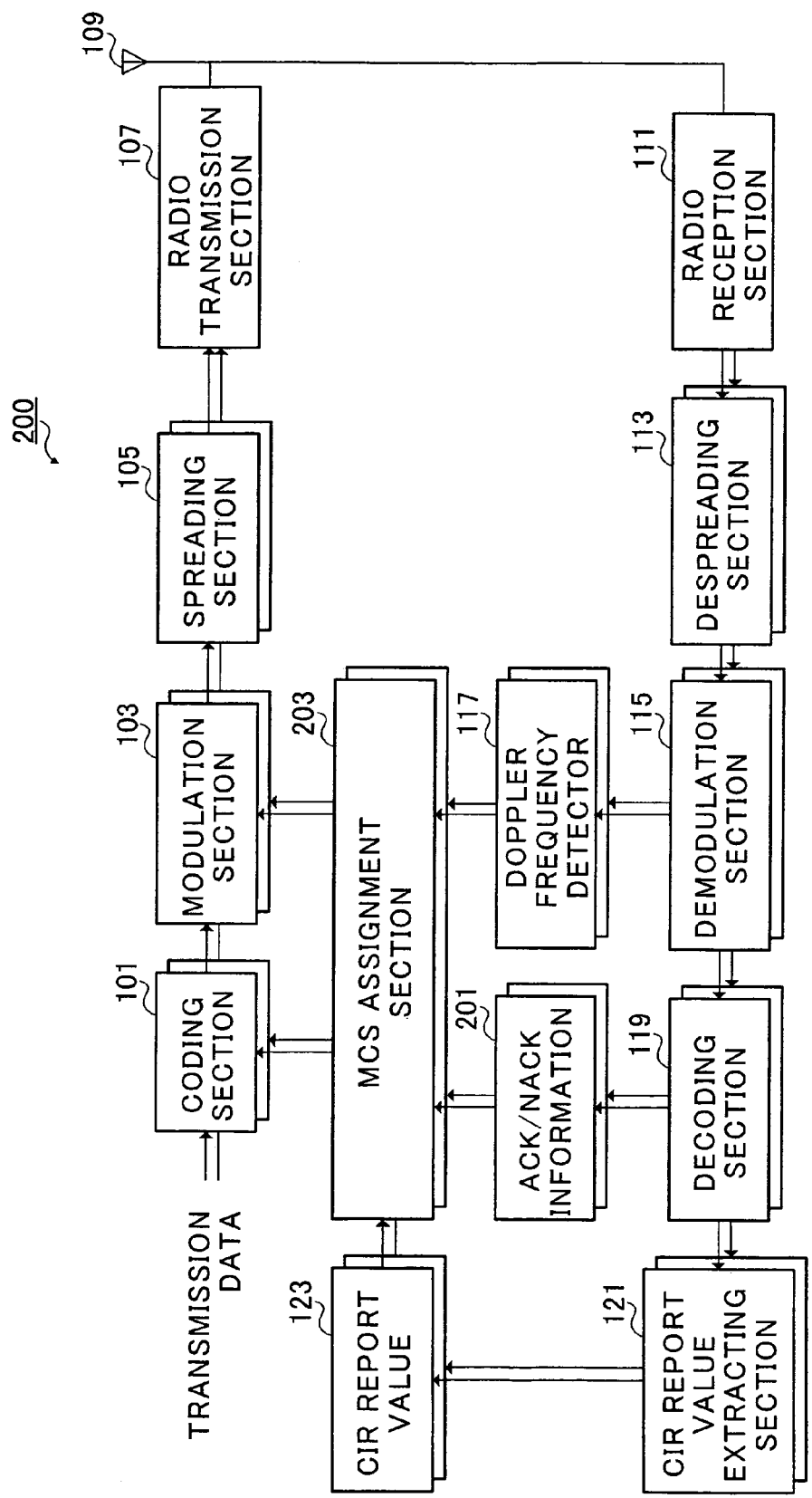
FIG. 5 is a block diagram illustrating a configuration of a radio communication apparatus on transmitting side according to a second embodiment of the present invention.

FIG. 5 is a block diagram illustrating a configuration of a radio communication apparatus on transmitting side according to the second embodiment of the present invention. In addition, radio communication apparatus 200 (base station) on transmitting side has basically the same configuration as that of radio communication apparatus 100 (base station) on transmitting side as illustrated in FIG. 1, and therefore, the same structural elements are assigned the same reference numerals to omit the descriptions. Further, a radio communication apparatus (mobile station) on receiving side that performs ratio communications with radio communication apparatus 200 (base station) on transmitting side has the same configuration as that of radio communication apparatus 150 (mobile station) on receiving side as illustrated in FIG. 2, and the descriptions thereof are omitted.

It is a feature of this embodiment to correct the relational expression of MCS (coding rate and modulation scheme) and CIR using Ack (Acknowledgement)/Nack (Negative acknowledgement) information from a mobile station in addition to the Doppler frequency (moving speed) of the mobile station. Therefore, the Ack/Nack information decoded in decoding section 119 is stored in Ack/Nack information storing section 201 in association with the mobile station that is a transmission source. MCS assignment section 203 is given the Doppler frequency (moving speed) of each mobile station detected in Doppler frequency detector 117 and Ack/Nack information from each mobile station stored in Ack/Nack information storing section 201.

The Ack/Nack information is information of whether retransmission is required in packet communications, and the Ack information indicates that no error exists in a received signal, i.e., the retransmission is not required, while the Nack information indicates an error exists in a received signal, i.e., the transmission is required. Aspects of transmission of the Ack/Nack information include a case of transmitting both the Ack information and Nack information and another case of transmitting either the Ack information or Nack information (for example, Ack information). In the latter case, for example, when the Ack information is not received, it is assumed that the Nack information is acquired.

MCS assignment section 203 assigns optimal MCS (coding rate and modulation scheme) to a mobile station, based on the CIR report value, Doppler frequency (moving speed) and Ack/Nack information of the mobile station, for each mobile station. Specifically, in the MCS assignment method (see FIGS. 3 and 4) in the first embodiment, the correction amount based on the Doppler frequency (moving rate) is further adjusted finely using the Ack/Nack information. For example, when the Ack information is received, the correction value based on the Doppler frequency is made smaller than the set value, while being made larger than the set value when the Nack information is received.

Thus, according to this embodiment, in the AMC technique, the Doppler frequency (moving speed) of each mobile station is detected, and based on the obtained Doppler frequency (moving speed) and Ack/Nack information, the relational expression of MCS (coding rate and modulation scheme) and CIR is corrected to determine optimal MCS, whereby it is possible to optimize assignments of the modulation scheme and coding rate with higher accuracy in the AMC technique.

Third Embodiment

Figure 6:
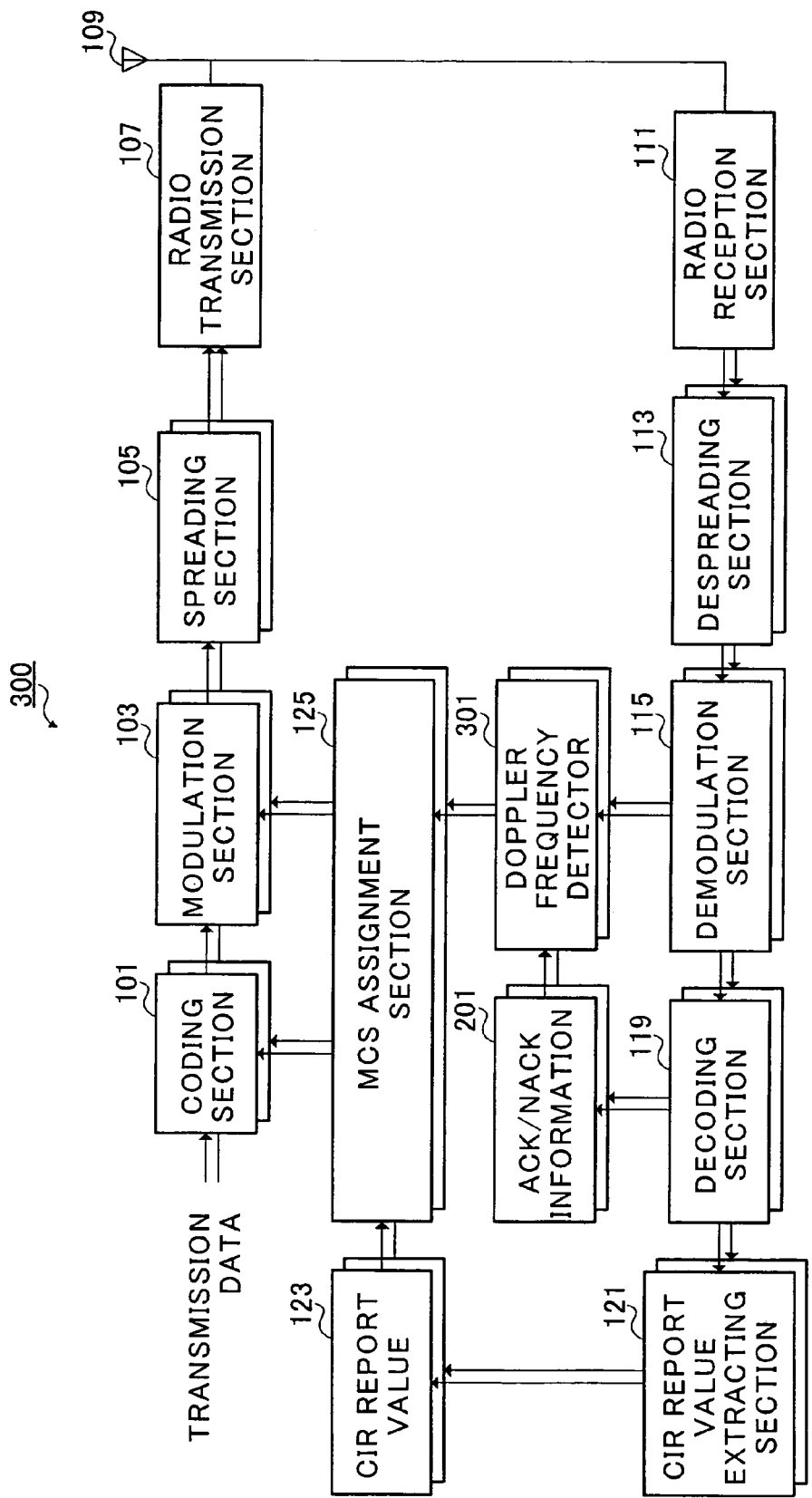
FIG. 6 is a block diagram illustrating a configuration of a radio communication apparatus on transmitting side according to a third embodiment of the present invention.

FIG. 6 is a block diagram illustrating a configuration of a radio communication apparatus on transmitting side according to the third embodiment of the present invention. In addition, radio communication apparatus 300 (base station) on transmitting side has basically the same configuration as that of radio communication apparatus 200 (base station) on transmitting side as illustrated in FIG. 2, and therefore, the same structural elements are assigned the same reference numerals to omit the descriptions. Further, a radio communication apparatus (mobile station) on receiving side that performs radio communications with radio communication apparatus 300 (base station) on transmitting side has the same configuration as that of radio communication apparatus 150 (mobile station) on receiving side as illustrated in FIG. 2, and the descriptions thereof are omitted.

It is a feature of this embodiment to directly correct the Doppler frequency (moving speed) of a mobile station using the Ack/Nack information from the mobile station, instead of correcting the relational expression of MCS and CIR using the Ack/Nack information from the mobile station. Therefore, the Ack/Nack information form each mobile station stored in Ack/Nack information storing section 201 is provided to Doppler frequency detector 301.

Doppler frequency detector 301 detects the Doppler frequency (moving speed) of each mobile station using the demodulated received signal, and at this point, corrects the calculation of the Doppler frequency using the Ack/Nack information from the mobile station for each mobile station. Specifically, when the Ack information is received, the Doppler frequency (moving speed) is corrected to be a smaller value, while being corrected to be a larger value when the Nack information is received. The Doppler frequency (moving speed) corrected using the Ack/Nack information is provided to MCS assignment section 125.

MCS assignment section 125 assigns optimal MCS (coding rate and modulation scheme) to each mobile station, using the same MCS assignment method (see FIGS. 3 and 4) as in the first embodiment.

Thus, according to this embodiment, since the Doppler frequency (moving speed) of a mobile station is corrected using the Ack/Nack information from the mobile station, the same effectiveness as in the first embodiment is obtained without correcting the MCS assignment method (see FIGS. 3 and 4) in the first embodiment.

In addition, in the second and third embodiments, the Ack/Nack information is used as auxiliary information. However, the usage of the Ack/Nack information is not limited to such a case. For example, it may be possible to correct the relational expression of MCS (coding rate and modulation scheme) and CIR using only the Ack/Nack information to determine optimal MCS. Specifically, for example, when the Ack information is received, the correction amount in selection is made smaller than the last set value, while being made larger than the last set value when the Nack information is received. Otherwise, for example, a value of "+A" is set when the Ack information is received, while a value of "−B" is set when the Nack information is received. Then, when the sum of the values exceeds a threshold of "+C", the correction amount in selection is made smaller than the last set value, while being made larger than the last set value when the sum of the values falls below a threshold of "−D" (herein, A, B, C and D may have the same value, or different values).

Fourth Embodiment

Figure 7:
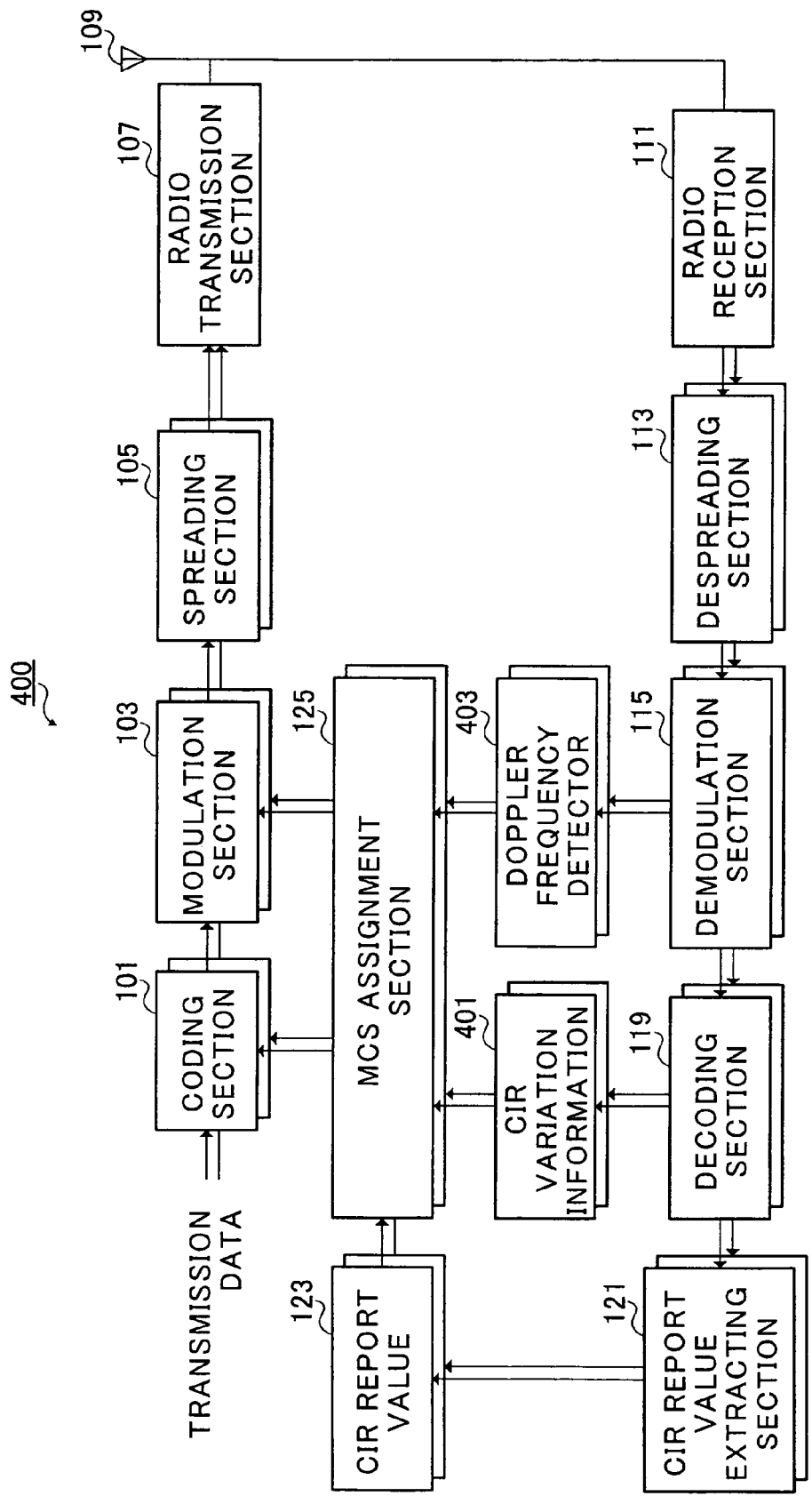
FIG. 7 is a block diagram illustrating a configuration of a radio communication apparatus on transmitting side according to a fourth embodiment of the present invention.

FIG. 7 is a block diagram illustrating a configuration of a radio communication apparatus on transmitting side according to the fourth embodiment of the present invention. In addition, radio communication apparatus 400 (base station) on transmitting side has basically the same configuration as that of radio communication apparatus 100 (base station) on transmitting side as illustrated in FIG. 1, and therefore, the same structural elements are assigned the same reference numerals to omit the descriptions. Further, a radio communication apparatus (mobile station) on receiving side that performs radio communications with radio communication apparatus 400 (base station) on transmitting side has the same configuration as that of radio communication apparatus 150 (mobile station) on receiving side as illustrated in FIG. 2, and the descriptions thereof are omitted.

It is a feature of this embodiment to correct the Doppler frequency (moving speed) of a mobile station using CIR variation information, instead of correcting the Doppler frequency of the mobile station using Ack/Nack information from the mobile station. The CIR variation information is of a difference (calculation value) between a CIR report value used in assignment of MCS and a report value of reception CIR of a signal that is transmitted in the assignment and then received. Therefore, in this embodiment, the base station is provided with CIR variation information storing section 401 that stores the CIR variation information, where the CIR variation information stored in CIR variation information storing section 401 is provided to Doppler frequency detector 403.

Doppler frequency detector 403 detects the Doppler frequency (moving speed) of each mobile station using the demodulated received signal, and corrects the calculation of the Doppler frequency, using the CIR variation information of the mobile station stored in CIR variation information storing section 401 for each mobile station. Specifically, for example, when the CIR variation value is small, it is determined that the Doppler frequency (moving speed) is small, and a detected Doppler frequency of large value is corrected to be a smaller Doppler frequency (moving speed). When the CIR variation value is large, it is determined that the Doppler frequency (moving speed) is large, and a detected Doppler frequency of small value is corrected to be a larger Doppler frequency (moving speed). The Doppler frequency (moving speed) corrected using the CIR variation information is output to MCS assignment section 125.

MCS assignment section 125 assigns optimal MCS (coding rate and modulation scheme) to each mobile station, using the same MCS assignment method (see FIGS. 3 and 4) as in the first embodiment.

Thus, according to this embodiment, since the Doppler frequency (moving speed) of a mobile station is corrected using the CIR variation information of the mobile station, it is possible to obtain the same effectiveness as in the first embodiment without correcting the MCS assignment method (see FIGS. 3 and 4) in the first embodiment.

Fifth Embodiment

Figure 8:
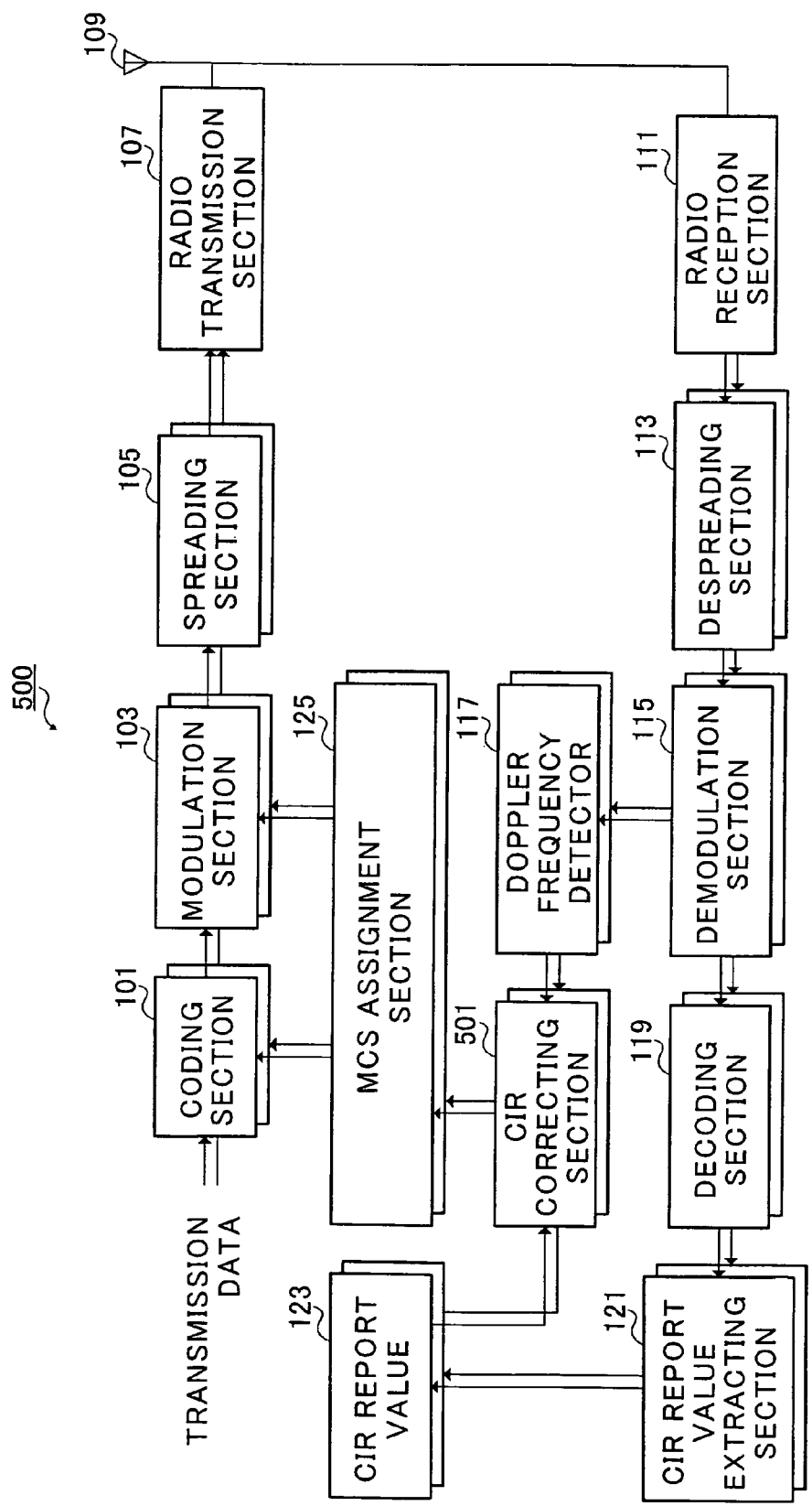
FIG. 8 is a block diagram illustrating a configuration of a radio communication apparatus on transmitting side according to a fifth embodiment of the present invention.

FIG. 8 is a block diagram illustrating a configuration of a radio communication apparatus on transmitting side according to the fifth embodiment of the present invention. In addition, radio communication apparatus 500 (base station) on transmitting side has basically the same configuration as that of radio communication apparatus 100 (base station) on transmitting side as illustrated in FIG. 1, and therefore, the same structural elements are assigned the same reference numerals to omit the descriptions. Further, a radio communication apparatus (mobile station) on receiving side that performs radio communications with radio communication apparatus 500 (base station) on transmitting side has the same configuration as that of radio communication apparatus 150 (mobile station) on receiving side as illustrated in FIG. 2, and the descriptions thereof are omitted.

It is a feature of this embodiment to directly correct a CIR report value from a mobile station using the Doppler frequency (moving speed) of the mobile station, instead of correcting the relational expression of MCS and CIR using the Doppler frequency (moving speed) of the mobile station. Therefore, the Doppler frequency (moving speed) detected in Doppler frequency detector 117 is output to CIR correcting section 501.

When reading out a CIR report value of a mobile station from CIR report value storing section 123 to provide to MCS assignment section 125, CIR correcting section 501 corrects the CIR report value using the Doppler frequency (moving speed) of the mobile station, for each mobile station.

Specifically, since the channel quality varies due to the effect of the Doppler frequency as described above, the section 501 corrects the CIR report value so as to decrease the transmission rate, i.e., decreases the CIR report value.

At this point, for example, as shown in the control table in FIG. 9, when the Doppler frequency (moving speed) of the mobile station is large, a correction value in CIR report value is set at a large value to correct the CIR report value largely. Further, when the Doppler frequency (moving speed) of the mobile station is of middle degree, a correction value in CIR report value is set at a middle value to correct the CIR report value to be a middle value, while when the Doppler frequency (moving speed) of the mobile station is small, a correction value in CIR report value is set at a small value to correct the CIR report value in a small range.

Thus, according to this embodiment, since the CIR report value is corrected using the Doppler frequency (moving speed) of the mobile station, it is possible to obtain the same effectiveness as in the first embodiment without correcting the relational expression (see FIG. 3) in MCS assignment method in the first embodiment.

Sixth Embodiment

Figure 10:
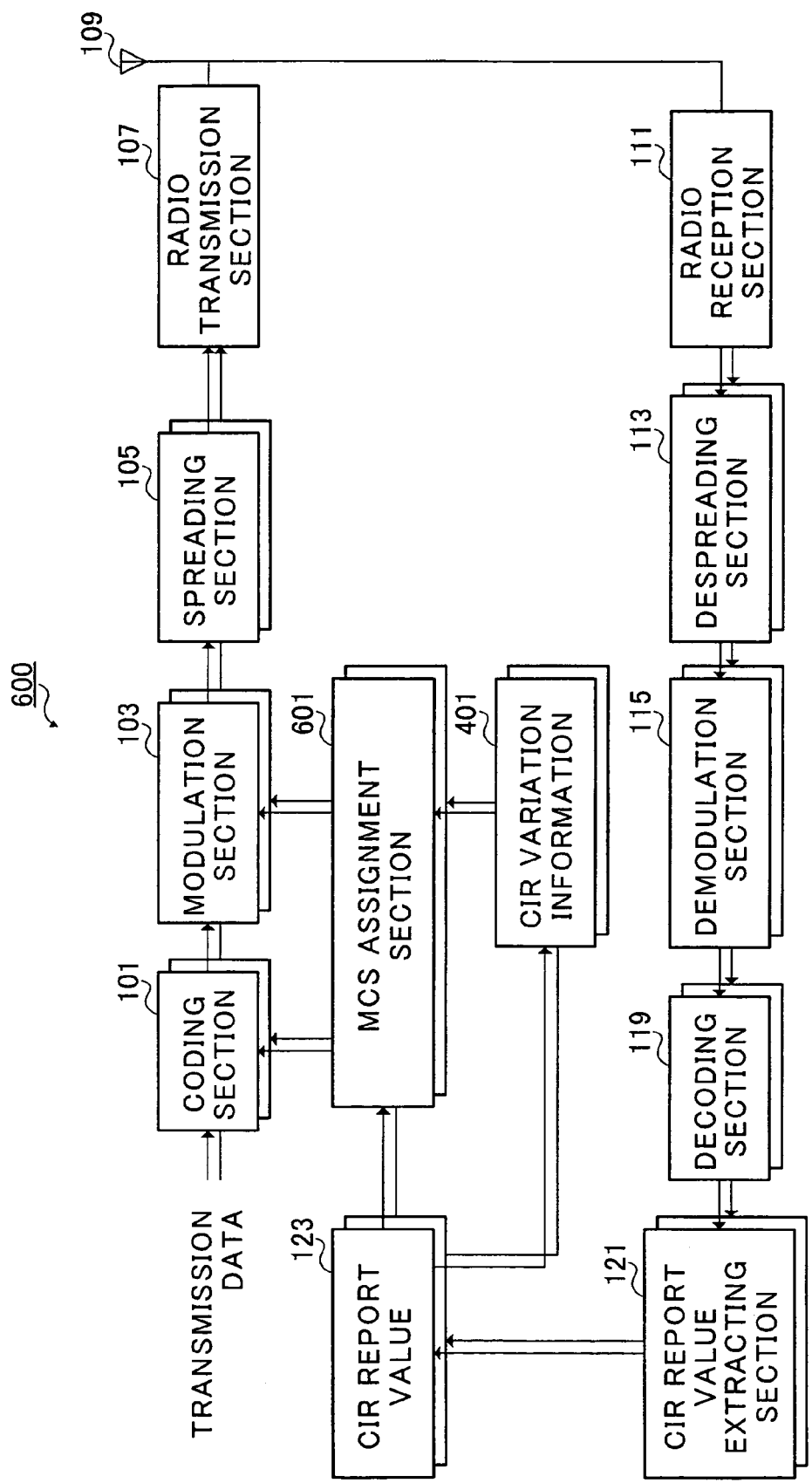
FIG. 10 is a block diagram illustrating a configuration of a radio communication apparatus on transmitting side according to a sixth embodiment of the present invention.

FIG. 10 is a block diagram illustrating a configuration of a radio communication apparatus on transmitting side according to the sixth embodiment of the present invention. In addition, radio communication apparatus 600 (base station) on transmitting side has basically the same configuration as that of radio communication apparatus 100 (base station) on transmitting side as illustrated in FIG. 1, and therefore, the same structural elements are assigned the same reference numerals to omit the descriptions. Further, a radio communication apparatus (mobile station) on receiving side that performs radio communications with radio communication apparatus 600 (base station) on transmitting side has the same configuration as that of radio communication apparatus 150 (mobile station) on receiving side as illustrated in FIG. 2, and the descriptions thereof are omitted.

It is a feature of this embodiment to correct the relational expression of MCS (coding rate and modulation scheme) and CIR using the CIR variation information, instead of correcting the relational expression based on the Doppler frequency of the mobile station. The CIR variation information is of a difference (calculation value) between a CIR report value used in assignment of MCS and a report value of reception CIR of a signal that is transmitted in the assignment and then received. Therefore, in this embodiment, the base station is provided with CIR variation information storing section 401 that stores the CIR variation information as in the fifth embodiment. The CIR variation information stored in CIR variation information storing section 401 is provided to MCS assignment section 601.

MCS assignment section 601 assigns optimal MCS (coding rate and modulation scheme) to a mobile station based on the CIR report value and CIR variation amount of the mobile station, for each mobile station.

Specifically, MCS assignment section 601 has the relational expression of MCS (coding rate and modulation scheme) and CIR as in the first embodiment, and selects MCS based on the CIR report value from each mobile station using the relational expression. At this point, by correcting the relational expression based on the CIR variation information of the mobile station, the section 601 determines optimal MCS for the mobile station. Specifically, the threshold in the relational expression is corrected based on the CIR variation amount of a mobile station.

In selecting MCS, for example, as shown in the control table in FIG. 11, when the CIR variation value of the mobile station is large, a correction value in selection is set at a large value to correct the threshold largely. Further, when the CIR variation value of the mobile station is of middle degree, a correction value in selection is set at a middle value to correct the threshold moderately, while when the CIR variation value of the mobile station is small, a correction value in selection is set at a small value to correct the threshold in a small range. In other words, when the deterioration of channel quality differs with the CIR variation value, the deterioration in each transmission rate (each MCS) is estimated, and the threshold is varied by a correction amount (margin) required for the estimated deterioration.

In addition, in varying the threshold, instead of varying the threshold every time, the threshold may be varied corresponding to environments. In other words, instead of setting a correction amount for an original threshold every time, it may be possible to vary the once determined correction amount by a small amount.

Thus, according to this embodiment, in the AMC technique, since the optimal MCS is determined by correcting the relational expression of MCS and (coding rate and modulation scheme) and CIR using the CIR variation information of each mobile station, it is possible to optimize assignments of the modulation scheme and coding rate with high accuracy in the AMC technique.

While in the above-mentioned first to sixth embodiments CIR is used as channel quality, the channel quality is not limited to CIR. For example, instead of CIR, any appropriate information may be used such as SIR, TFRC, and transmission power of a dedicated channel (for example, DPCH).

Further, while each of the first to sixth embodiments describes the case where the base station assigns MCS (determines the transmission rate), the present invention is not limited to such a case. For example, it may be possible that a mobile station assigns MCS in the same way. Furthermore, it may be possible that a mobile station reports a receivable transmission rate to a base station, and based on a result of the report, the base station assigns an optimal transmission rate. In the latter case, it is not required that the transmission rate assigned by the base station accords with the transmission rate reported by the mobile station, and the report of transmission rate from the mobile station is used only as a reference in assignment in the base station.

Moreover, while each of the first to sixth embodiments describes, as an example, the case where the AMC technique is used as a data transmission system, the present invention is not limited to such a case. The present invention is applicable to any data transmission systems that control the transmission rate. In other words, since the spreading rate and transmission power has effects on determination of transmission rate, as well as the modulation scheme and coding rate, the present invention is applicable widely to data transmission systems where various parameters affecting determination of transmission rate are varied.

These pieces of information are effective at determining mobile stations (scheduling) to transmit signals, as well as at determining the transmission rate. For example, when a mobile station with a high transmission has a high priority, it is possible to perform scheduling efficiently by using thus corrected transmission rate.

Moreover, while each of the first to sixth embodiments describes, as an example, the case where the transmission rate is corrected by correcting the relational expression of MCS (transmission rate) and CIR (channel quality information) as a method of correcting the transmission rate, the present invention is not limited to such a case, and it may be possible to directly correct the transmission rate based on the above-mentioned predetermined parameters.

In the foregoing, it is described that the predetermined correction processing is carried out in determining the transmission rate, for example, assigning MCS (coding rate and modulation scheme) so as to optimize the determination of transmission rate with high accuracy. In other words, since an error occurs in information (for example, report value of CIR) from a mobile station in determining the transmission rate due to fading and delay in assignment, it is preferable to perform correction processing as described in either of the first to sixth embodiments in assigning MCS (coding rate and modulation scheme), for example. However, it is not required to always perform such correction processing, and it is preferable to perform the correction processing only when necessary, from the viewpoint of performing optimal control while reducing the processing amount and decreasing the power consumption.

As described above, the correction processing can be carried out in either a base station or mobile station. Accordingly, mobile stations are divided into ones that perform the correction processing and the other ones that do not perform the correction processing, and it is considered that among the ones that perform the correction processing, the content of the correction processing differs from one another. However, it is not necessary for both of the mobile station and base station to perform the correction processing concurrently and it is preferable that the processing is adjusted between the base station and mobile station, from the viewpoint of performing optimal control while reducing the processing amount and decreasing the power consumption over the entire mobile communication system.

The seventh and eighth embodiments as described below respectively cope with the former and latter issues.

Seventh Embodiment

Figure 12:
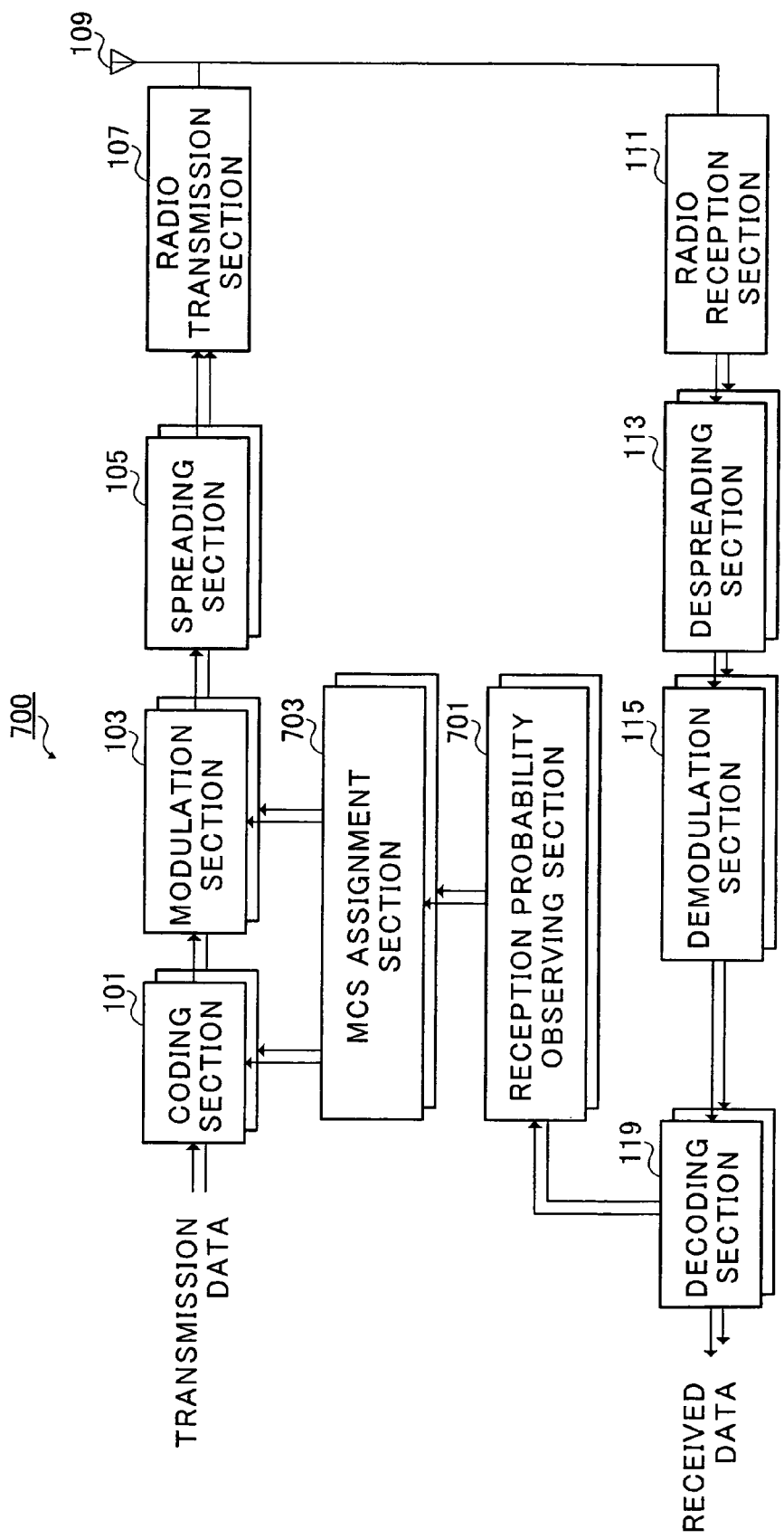
FIG. 12 is a block diagram illustrating a configuration of a radio communication apparatus on transmitting side according to a seventh embodiment of the present invention.

FIG. 12 is a block diagram illustrating a configuration of a radio communication apparatus on transmitting side according to the seventh embodiment of the present invention. In addition, radio communication apparatus 700 (base station) on transmitting side has basically the same configuration as that of radio communication apparatus 100 (base station) on transmitting side as illustrated in FIG. 1, and therefore, the same structural elements are assigned the same reference numerals to omit the descriptions. Further, a radio communication apparatus (mobile station) on receiving side that performs radio communications with radio communication apparatus 700 (base station) on transmitting side has the same configuration as that of radio communication apparatus 150 (mobile station) on receiving side as illustrated in FIG. 2, and the descriptions thereof are omitted.

It is a feature of this embodiment to determine whether to perform predetermined correction processing in assigning MCS (coding rate and modulation scheme), based on a probability (reception probability) that data (that is not retransmitted data) first transmitted from a base station is received in a mobile station without any error. Therefore, reception probability observing section 701 is provided between decoding section 119 and MCS assignment section 703. Reception probability observing section 701 receives the Ack/Nack information of the mobile station of data (packet data) that has been transmitted first from the base station from decoding section 119, and records the information a determined number of times to calculate the reception probability. The calculated reception probability is output to MCS assignment section 703. In addition, MCS assignment section 703 has optional correction functions including correction functions that MCS assignment sections 125, 203 and 601 in the first to sixth embodiments have. Hence, herein, sections used in inputting information required for the correction processing are not shown in the figure, and the content of the correction processing in MCS assignment section 703 is omitted.

MCS assignment section 703 determines whether to perform the predetermined correction processing in assigning MCS for each mobile station, based on the reception probability output from reception probability observing section 701. For example, when the reception probability is extremely high (as an example, when the reception probability is 90% or more), the section 703 judges that the system is controlled in such a way that the correction value converges to an excessive level, and performs the correction processing so as to correct such control. Meanwhile, when the reception probability is low (as an example, when the reception probability is 75% or less), the section 703 judges that the system is controlled in such a way that the correction value converges to an unallowable level, and performs the correction processing so as to correct such control. On the contrary, when the reception probability is in a predetermined range (as an example, when the reception probability is in a range from 75% to 90%), the section 703 judges that the correction value is kept at an appropriate level and the correction processing does not need to be carried out, and does not perform the correction processing from the viewpoint of reducing the processing amount and decreasing the power consumption.

Thus, according to this embodiment, since based on the reception probability in the mobile station, it is determined whether to perform the correction processing in assigning MCS, the correction processing is carried out only when necessary, and it is possible to reduce the processing amount and decrease the power consumption.

In addition, in this embodiment, only data first transmitted from a base station is considered as a basis in calculating the reception probability, but the present invention is not limited to the foregoing. For example, it may be possible to calculate the reception probability in a mobile station for all data transmitted from a base station including retransmitted data and determine whether to perform the correction processing based on the calculation result.

Further, while this embodiment describes the case where the base station performs the MCS assignment processing (determination of transmission rate), the present invention is not limited to such a case, as described on the first to sixth embodiments.

Furthermore, while this embodiment describes the case of using the AMC technique as a data transmission system as an example, the present invention is not limited to such a case, as described on the first to sixth embodiments.

Eighth Embodiment

This embodiment describes a case where both a base station and mobile station have the correction function. The content of the correction function is not limited particularly. For example, the base station and mobile station both are capable of having the configuration on transmitting side (see FIGS. 1, 5 to 8 and 10) and the configuration on receiving side (see FIG. 2) as described above.

It is a feature of this embodiment that a mobile station transmits to a base station a signal to notify whether or not the mobile station is performing the correction processing, and when the base station needs to suspend the correction processing in the mobile station at the time the base station performs the correction processing, the base station transmits to the mobile station a signal to suspend the correction processing in the mobile station. These signals are transmitted using DPCH, for example.

Specifically, for example, a mobile station transmits to a base station a signal (notification signal) to notify whether or not the mobile station is performing the correction processing. In this case, the base station may request the mobile station to transmit the above-mentioned notification signal (this request is also made using DPCH, for example). The base station having received the notification immediately performs the correction processing when the mobile station does not perform the correction processing, while monitoring results of the correction processing in the mobile station for a predetermined period to determine whether or not to need to perform the correction processing instead of the mobile station or together with the mobile station, when the mobile station performs the correction processing. In addition, the base station is capable of performing the correction processing, while monitoring results of correction processing in the mobile station.

Further, when the base station needs to suspend the correction processing in the mobile station in performing the correction processing in the base station, the base station transmits to the mobile station a signal (suspending signal) to suspend the correction processing in the mobile station.

The mobile station having received the suspending signal suspends the correction processing according to the received suspending signal. Thus, the base station is capable of executing the correction processing assuredly as intended.

Thus, according to this embodiment, in the case where a base station and mobile station both have the correction function, the mobile station transmits to the base station the signal to notify whether or not the mobile station is performing the correction processing according to a request from the base station, and when the base station needs to suspend the correction processing in the mobile station in performing the correction processing in the base station, the base station transmits to the mobile station the signal to suspend the correction processing in the mobile station. Therefore, it can be eliminated that the mobile station and base station both perform the correction processing concurrently when such concurrent processing is not required, and it is possible to reduce the processing amount and decrease the power consumption over the entire mobile communication system, and to carry out the optimal control.

As described above, according to the present invention, it is possible to optimize the determination of transmission rate with high accuracy.

This application is based on the Japanese Patent Applications No. 2001-395160 filed on Dec. 26, 2001, and No. 2002-030942 filed on Feb. 7, 2002, entire contents of which are expressly incorporated by reference herein.

INDUSTRIAL APPLICABILITY

The present invention is applicable to a radio communication apparatus provided in a mobile station apparatus and base station apparatus in a mobile communication system.

The invention claimed is:

1. A radio communication apparatus comprising:
   a channel quality information extracting section that extracts channel quality information showing channel quality of a communicating partner from a received signal;
   a determining section that determines a transmission rate in response to the channel quality of the channel quality information extracted in the channel quality information extracting section using a relational expression that specifies a relationship between the channel quality and the transmission rate;
   a detecting section that detects a relative moving speed of the communicating partner;
   an acquiring section that acquires from the received signal retransmission request information indicative of whether retransmission to the communicating partner is required; and
   a correcting section that corrects the transmission rate determined in the determining section, based on the relative moving speed detected in the detecting section and the retransmission request information acquired in the acquiring section.

2. A radio communication apparatus comprising:
   a channel quality information extracting section that extracts channel quality information showing channel quality of a communicating partner from a received signal;
   a determining section that determines a transmission rate in response to the channel quality of the channel quality information extracted in the channel quality information extracting section using a relational expression that specifies a relationship between the channel quality and the transmission rate;

a detecting section that detects a relative moving speed of the communicating partner;

an acquiring section that acquires from the received signal retransmission request information indicative of whether retransmission to the communicating partner is required;

a relative moving speed correcting section that corrects the relative moving speed detected in the detecting section, based on the retransmission request information acquired in the acquiring section; and a correcting section that corrects the transmission rate determined in the determining section, based on the corrected relative moving speed.

3. A radio communication apparatus comprising:

a channel quality information extracting section that extracts channel quality information showing channel quality of a communicating partner from a received signal;

a determining section that determines a transmission rate in response to the channel quality of the channel quality information extracted in the channel quality information extracting section using a relational expression that specifies a relationship between the channel quality and the transmission rate;

a detecting section that detects a relative moving speed of the communicating partner;

a calculating section that calculates an amount of variation in channel quality;

a relative moving speed correcting section that corrects the relative moving speed detected in the detecting section, based on the amount of variation in channel quality calculated in the calculating section; and a correcting section that corrects the transmission rate determined in the determining section, based on the corrected relative moving speed.

4. A radio communication apparatus comprising:

a channel quality information extracting section that extracts channel quality information showing channel quality of a communicating partner from a received signal;

a determining section that determines a transmission rate in response to the channel quality of the channel quality information extracted in the channel quality information extracting section using a relational expression that specifies a relationship between the channel quality and the transmission rate;

a detecting section that detects a relative moving speed of the communicating partner; and a correcting section that corrects the channel quality information extracted in the channel quality information extracting section based on the relative moving speed detected in the detecting section.

5. A radio communication apparatus comprising:

a channel quality information extracting section that extracts channel quality information showing channel quality of a communicating partner from a received signal;

a determining section that determines a transmission rate in response to the channel quality of the channel quality information extracted in the channel quality information extracting section using a relational expression that specifies a relationship between the channel quality and the transmission rate;

a detecting section that detects a relative moving speed of the communicating partner; and a correcting section that corrects the relational expression based on the relative moving speed detected in the detecting section.

6. The radio communication apparatus according claim 5, further comprising:

an acquiring section that acquires from the received signal retransmission request information indicative of whether retransmission to the communicating partner is required, wherein the correcting section corrects the relational expression based on the relative moving speed detected in the detecting section and the retransmission request information acquired in the acquiring section.

7. The radio communication apparatus according to claim 5, further comprising:

an acquiring section that acquires from the received signal retransmission request information indicative of whether retransmission to the communicating partner is required; and a relative moving speed correcting section that corrects the relative moving speed detected in the detecting section, based on the retransmission request information acquired in the acquiring section, wherein the correcting section corrects the relational expression based on the relative moving speed corrected in the relative moving speed correcting section.

8. The radio communication apparatus according to claim 5, further comprising:

a calculating section that calculates an amount of variation in channel quality; and a relative moving speed correcting section that corrects the relative moving speed detected in the detecting section, based on the amount of variation in channel quality calculated in the calculating section, wherein the correcting section corrects the relational expression based on the relative moving speed corrected in the relative moving speed correcting section.

9. A radio communication apparatus comprising:

a channel quality information extracting section that extracts channel quality information showing channel quality of a communicating partner from a received signal;

a determining section that determines a transmission rate in response to the channel quality of the channel quality information extracted in the channel quality information extracting section using a relational expression that specifies a relationship between the channel quality and the transmission rate;

a calculating section that calculates an amount of variation in channel quality; and a correcting section that corrects the relational expression based on the amount of variation in channel quality calculated in the calculating section.

10. A communication system comprising:

a radio communication apparatus; and a communicating partner radio communication apparatus that is a communicating partner of the radio communication apparatus, wherein:

the radio communication apparatus comprises:

a correcting section that performs predetermined correction processing based on information regarding a variation in channel quality, in determining a transmission rate; and a transmitting section that transmits to a communicating partner a signal to suspend the correction processing in the communicating partner; and the communicating partner radio communication apparatus comprises:
- a correcting section that performs predetermined correction processing based on the information regarding a variation in channel quality, in determining a transmission rate;
- a receiving section that receives the signal to suspend the correction processing transmitted from the radio communication apparatus; and
- a control section that suspends the correction processing in the correcting section based on the signal received in the receiving section.

11. A transmission rate determining method in a radio communication apparatus, comprising:
- a channel quality information extracting step of extracting channel quality information showing channel quality of a communicating partner from a received signal;
- a determining step of determining a transmission rate in response to the channel quality of the channel quality information extracted in the channel quality information extracting step using a relational expression that specifies a relationship between the channel quality and the transmission rate;
- a detecting step of detecting a relative moving speed of the communicating partner; and
- a correcting step of correcting the channel quality information extracted in the channel quality information extracting step based on the relative moving speed detected in the detecting step.

12. A transmission rate determining method in a radio communication apparatus, comprising:
- a channel quality information extracting step of extracting channel quality information showing channel quality of a communicating partner from a received signal;
- a determining step of determining a transmission rate in response to the channel quality of the channel quality information extracted in the channel quality information extracting step using a relational expression that specifies a relationship between the channel quality and the transmission rate;
- a detecting step of detecting a relative moving speed of the communicating partner; and
- a correcting step of correcting the relational expression based on the relative moving speed detected in the detecting step.

13. A transmission rate determining method in a radio communication apparatus, comprising:
- a channel quality information extracting step of extracting channel quality information showing channel quality of a communicating partner from a received signal;
- a determining step of determining a transmission rate in response to the channel quality of the channel quality information extracted in the channel quality information extracting step using a relational expression that specifies a relationship between the channel quality and the transmission rate;
- a detecting step of detecting a relative moving speed of the communicating partner; and
- a correcting step of correcting the channel quality information extracted in the channel quality information extracting step based on the relative moving speed detected in the detecting step.

14. A transmission rate determining method in a radio communication apparatus, comprising:
- a channel quality information extracting step of extracting channel quality information showing channel quality of a communicating partner from a received signal;
- a determining step of determining a transmission rate in response to the channel quality of the channel quality information extracted in the channel quality information extracting step using a relational expression that specifies a relationship between the channel quality and the transmission rate;
- a calculating step of calculating an amount of variation in channel quality as information regarding the variation in channel quality; and
- a correcting step of correcting the relational expression based on the amount of variation in channel quality calculated in the calculating step.

* * * * *